US009180608B2

(12) United States Patent
Ko et al.

(10) Patent No.: US 9,180,608 B2
(45) Date of Patent: Nov. 10, 2015

(54) STAMP, METHOD OF MANUFACTURING THE SAME, AND IMPRINTING METHOD USING THE STAMP

(75) Inventors: Woong Ko, Hwaseong-si (KR); Ki-yeon Yang, Seoul (KR); Byung-kyu Lee, Seoul (KR); Du-hyun Lee, Suwon-si (KR); Jae-kwan Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 478 days.

(21) Appl. No.: 13/489,968

(22) Filed: Jun. 6, 2012

(65) Prior Publication Data

US 2013/0042779 A1 Feb. 21, 2013

(30) Foreign Application Priority Data

Aug. 19, 2011 (KR) .................. 10-2011-0083055

(51) Int. Cl.
*B29C 33/38* (2006.01)
*B29C 33/42* (2006.01)
*B29C 43/02* (2006.01)

(52) U.S. Cl.
CPC ............. *B29C 33/424* (2013.01); *B29C 43/021* (2013.01); *B29C 2043/025* (2013.01)

(58) Field of Classification Search
CPC .................. B29C 2043/025; B29C 33/424
USPC .................................. 101/28, 401.1
See application file for complete search history.

(56) References Cited

U.S. PATENT DOCUMENTS

2005/0206048 A1\* 9/2005 Ryu et al. ........................ 264/614
2005/0285308 A1\* 12/2005 Hattori et al. .................. 264/293
2006/0251698 A1\* 11/2006 Shen et al. ..................... 424/423

FOREIGN PATENT DOCUMENTS

| KR | 10-2008-0103325 A | 11/2008 |
| KR | 10-2009-0072737 A | 7/2009 |
| KR | 10-2011-0021129 A | 3/2011 |
| WO | WO-2009/128946 A1 | 10/2009 |

\* cited by examiner

*Primary Examiner* — Jennifer Simmons
(74) *Attorney, Agent, or Firm* — Harness, Dickey & Pierce, P.L.C.

(57) ABSTRACT

A stamp includes at least one protrusion on a protrusion pattern, and an end portion of the at least one protrusion may have a non-planarized surface. The end portion of the protrusion may have a concave structure, that is, the end portion includes a center region and an edge region, and the edge region is higher than the center region.

15 Claims, 13 Drawing Sheets

< CONVENTIONAL ART >

< CONVENTIONAL ART >

STAMP, METHOD OF MANUFACTURING THE SAME, AND IMPRINTING METHOD USING THE STAMP

CROSS-REFERENCE TO RELATED APPLICATIONS

This application claims the benefit of Korean Patent Application No. 10-2011-0083055, filed on Aug. 19, 2011, in the Korean Intellectual Property Office, the disclosure of which is incorporated herein in its entirety by reference.

BACKGROUND

1. Field

Some example embodiments relate to stamps, methods of manufacturing the stamps, and/or imprinting methods using the stamps.

2. Description of the Related Art

A nanoimprinting process is a method of transferring fine patterns by pressing a resin layer on a substrate with a stamp having a fine pattern. The stamp may be repeatedly used and an imprinting process may be relatively easily performed. Accordingly, the nanoimprinting operation has drawn attention as a next-generation lithography technology by which fine patterns may be economically and efficiently embodied.

However, as patterns, e.g., protrusion patterns, of the stamp become several tens of nanometer (nm) or less, there may be some problems in transferring the patterns of the stamp on a resin layer. Therefore, it is difficult to realize well-defined fine patterns by using a conventional stamp and imprinting method.

SUMMARY

Some example embodiments provide stamps capable of improving characteristics of imprinting process including etching characteristics after the imprinting process.

Some example embodiments provide stamps suitable for three-dimensional (3D) patterning and/or fine patterning.

Other example embodiments provide methods of manufacturing stamps.

Other example embodiments provide imprinting methods using the stamps.

Additional aspects will be set forth in part in the description which follows and, in part, will be apparent from the description, or may be learned by practice of example embodiments.

According to an example embodiment, a stamp includes a protrusion pattern on a base portion, the protrusion pattern including at least one protrusion having an end portion, the end portion having a center region and an edge region, the edge region being higher than the center region.

The end portion of the at least one protrusion may have a concave shape. The at least one protrusion may be nano-sized. The stamp may be for performing a nano-imprinting process.

According to another example embodiment, an imprinting method includes forming a resin layer on a substrate, imprinting a stamp onto the resin layer, the stamp including a protrusion pattern on a base portion, and the protrusion pattern includes at least one protrusion having an end portion, the end portion having a center region and an edge region, the edge region being higher than the center region, separating the stamp from the resin layer, and etching the resin layer in a lower portion of at least one hole formed by the stamp.

The resin layer in the lower portion of the at least one hole may have a convex shape prior to etching the resin layer. The etching may include planarizing a bottom surface of the at least one hole in the resin layer. The etching may expose portions of the substrate corresponding to the at least one hole.

According to another example embodiment, a method of manufacturing a stamp includes preparing a master mold including a protrusion pattern region, the protrusion pattern region including at least one hole having an end portion, the end portion having a center region and an edge region, the center region being higher than the edge region, and forming a stamp having a protrusion pattern portion that corresponds to the protrusion pattern region by using the master mold.

The forming may form at least one protrusion in the stamp corresponding to the at least one hole of the master mold, and an end portion of the at least one protrusion may have a center region and an edge region, the edge region being higher than the center region. The preparing may include forming the end portion of the at least one hole to have a convex structure, and forming the stamp may include forming the end portion of the at least one protrusion to have a concave structure.

According to another example embodiment, a method of manufacturing a stamp includes preparing a master mold including a protrusion pattern region, forming a stamp having a protrusion pattern portion that corresponds to the protrusion pattern region using the master mold, and adjusting a shape of an end portion of at least one protrusion of the protrusion pattern portion.

The forming may form the end portion of the at least one protrusion to have a flat surface prior to the adjusting. The adjusting may adjust the end portion of the at least one protrusion to have a center region and an edge region, the edge region being higher than the center region. The adjusting may adjust the end portion of the at least one protrusion to have a concave structure.

The adjusting may include etching the end portion of the at least one protrusion. The etching may include an ion milling process. The forming the stamp may include forming a material layer on the protrusion pattern region of the master mold, hardening the material layer to form a hardened layer having a protrusion pattern portion corresponding to the protrusion pattern region, and separating the hardened layer from the master mold.

The material layer may be pressed with a supporting plate after the forming and prior to the hardening. At least a portion of the supporting plate may be patterned using the protrusion pattern portion of the hardened layer after the separating.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. In this regard, example embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
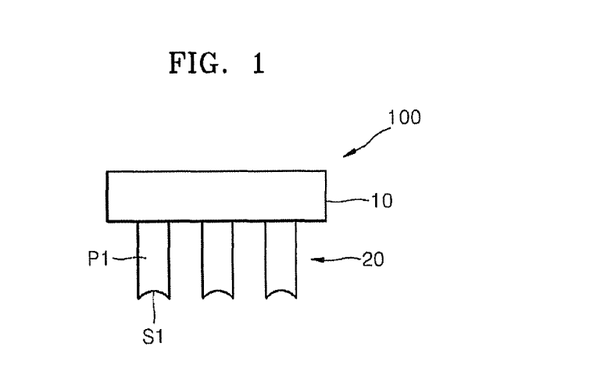
FIG. 1 is a cross-sectional view of a stamp according to an example embodiment.

FIG. 1 is a cross-sectional view of a stamp 100 according to an example embodiment. Referring to FIG. 1, the stamp 100 may include a base portion 10 and a protrusion pattern (an uneven portion) 20 disposed on a surface of the base portion 10. The protrusion pattern 20 may be disposed on a lower surface of the base portion 10. However, if the stamp 100 is reversed upside down, the protrusion pattern 20 may be disposed on an upper surface of the base portion 10. Relative location relationship between the base portion 10 and the protrusion pattern 20 may vary depending on a posture of the stamp 100. The base portion 10 and the protrusion pattern 20 may or may not be formed of the same material. The protrusion pattern 20 may include at least one protrusion P1. A plurality of protrusions P1 may be arranged separate from each other. A space between two adjacent protrusions P1 may be regarded as a depression (recessed portion). Therefore, the protrusion pattern 20 has a structure in which the protrusions P1 and the depressions are arranged alternately. The protrusion P1 may have a nano-sized width. For example, the width of the protrusion P1 may be a few to hundreds of nm, for example, a few to tens of nm. A distance between two adjacent protrusions P1 may be a few to hundreds of nm, for example, a few to tens of nm.

A bottom surface S1 (that is, a lower surface) of the protrusion P1 may not be flat. That is, the bottom surface S1 of the protrusion P1 may have an unplanarized structure. For example, the bottom surface S1 of the protrusion P1 may have an edge region higher than a center region thereof. In this case, the bottom surface 51 of the protrusion P1 may have a concave shape, as shown in FIG. 1. Since the bottom surface S1 of the protrusion P1 corresponds to an end portion of the protrusion P1, the shape of the bottom surface S1 refers to the shape of the end portion. In relation to the structure of the bottom surface S1, that is, the end portion of the protrusion P1, characteristics/results of an imprinting process using the stamp 100 may be improved. This will be described in more detail later.

Figure 9:
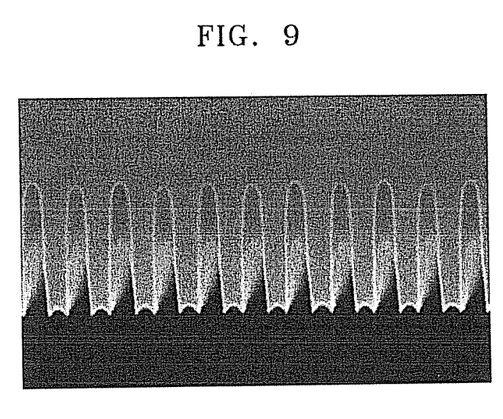
FIG. 9 is a scanning electron microscopy (SEM) photograph of a stamp manufactured according to an example embodiment.

FIG. 9 is a scanning electron microscopy (SEM) photograph of a stamp that is manufactured to have a similar structure to that of the stamp 100 of FIG. 1. The stamp of FIG. 9 includes a plurality or protrusions, a bottom surface of which has a concave shape.

Figure 2:
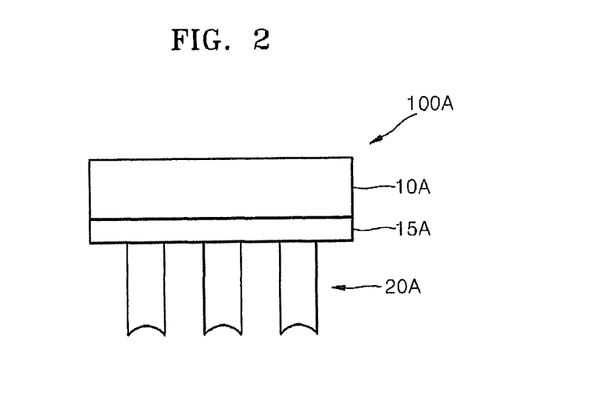
FIG. 2 is a cross-sectional view of a stamp according to another example embodiment.

FIG. 2 is a cross-sectional view of a stamp 100A according to another example embodiment. Referring to FIG. 2, the stamp 100A may include a base portion 10A, a protrusion pattern 20A, and an intermediate layer 15A disposed between the base portion 10A and the protrusion pattern 20A. The base portion 10A and the protrusion pattern 20A may have structures that are the same as or similar to those of the base portion 10 and the protrusion pattern 20 shown in FIG. 1. The intermediate layer 15A may be a layer formed of the same material as that of the protrusion pattern 20A.

In this point of view, the intermediate layer 15A may be considered as a part of the protrusion pattern 20A. That is, the combination of the intermediate portion 15A and the protrusion pattern 20A may be referred to as a "protrusion member". Otherwise, in consideration of the structure of the intermediate layer 15A, the intermediate layer 15A may be considered as a part of the base portion 10A. That is, the combination of the intermediate layer 15A and the base portion 10A may be referred to as a "base member".

As shown in FIG. 2, when the intermediate layer 15A is used, the intermediate layer 15A and the protrusion pattern 20A may be formed of the same material, and the base portion 10A may be formed of a material that is different from the material forming the intermediate layer 15A and the protrusion pattern 20A. The selection of material may be related to the manufacturing method of the stamp 100A, and this will be described in more detail later. However, if necessary, the intermediate layer 15A and the protrusion pattern 20A may be formed of different materials from each other. In addition, the base portion 10A may be formed of a material that is the same as at least one of the intermediate layer 10A and the protrusion pattern 20A.

In FIGS. 1 and 2, the protrusion patterns 20 and 20A are represented in simple shapes for the convenience of description; however, shapes of the protrusion patterns 20 and 20A may be modified variously. For example, the protrusion patterns 20 and 20A may have complex three-dimensional structures. In some cases, the protrusion patterns 20 and 20A may include curved surfaces in other regions besides the bottom surfaces S1.

Figure 3A:
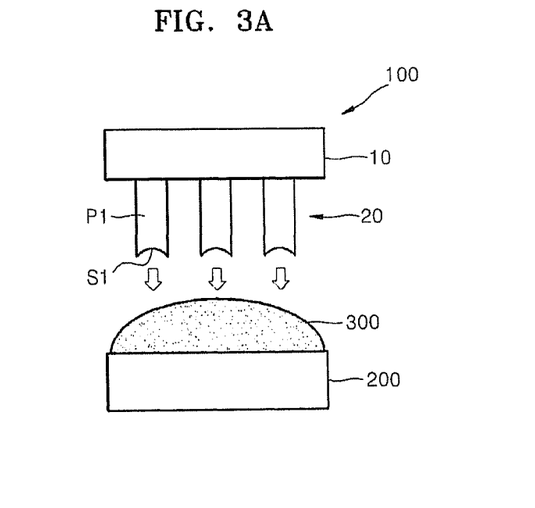
FIGS. 3A through 3E are cross-sectional views illustrating an imprinting method using a stamp according to an example embodiment.

FIGS. 3A through 3E are cross-sectional views illustrating an imprinting method using a stamp according to an example embodiment. Referring to FIG. 3A, a resin layer 300 may be formed, e.g., applied, on a given (or alternatively, predetermined) substrate 200. A stamp 100 may be located above the resin layer 300. The stamp 100 may be the stamp 100 shown in FIG. 1. Therefore, the stamp 100 may include the base portion 10 and the protrusion pattern 20, the protrusion pattern 20 may include at least one protrusion P1, and the bottom surface S1 of the protrusion P1 may have an edge region that is higher than a center region (for example, a concave structure).

Figure 3B:
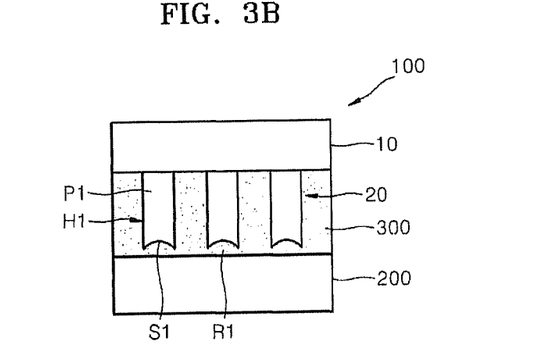

Referring to FIG. 3B, the stamp 100 is imprinted onto the resin layer 300 so as to transfer the shape of the protrusion pattern 20 of the stamp 100 onto the resin layer 300. Here, holes H1 may be formed in the resin layer 300 due to the protrusions P1 of the stamp 100. Resins R1 having a given (or alternatively, predetermined) shape and thickness may remain under the holes H1. Hereinafter, the resins R1 remaining under the holes H1 will be referred to as remaining resin portions R1. A shape of the remaining resin portion R1 may be determined according to the shape of the bottom surface S1 of the protrusion P1. If the bottom surface S1 of the protrusion P1 has the concave structure, the remaining resin portion R1 may have a structure corresponding to the bottom surface S1, that is, a convex structure. Here, a thickness of a center region of the remaining resin portion R1 may be thicker than that of an edge region of the remaining resin portion R1.

Figure 3C:
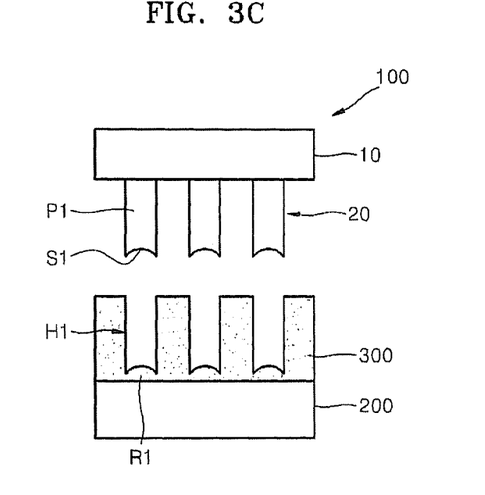

Referring to FIG. 3C, the stamp 100 may be separated from the resin layer 300. Before separating the stamp 100, a given (or alternatively, predetermined) hardening process of the resin layer 300 may be performed. That is, after performing the hardening of the resin layer 300, the stamp 100 may be separated from the resin layer 300. The hardening process may include, for example, an ultraviolet (UV) ray irradiation or an annealing process.

Figure 3D:
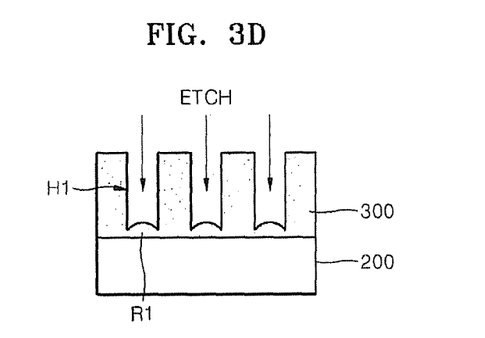

Referring to FIG. 3D, an etching process for removing the remaining resin portion R1 may be performed. The etching process may be performed with respect to the entire resin layer 300 including the remaining resin portions R1. The etching process may be an anisotropic etching process, and may be performed as a dry-etching process. Etching speed at the center region of the remaining resin portion R1 under the hole H1 may be faster than that at the edge region of the remaining resin portion R1. That is, the center region of the remaining resin portion R1 may be etched faster than the edge region of the remaining resin portion R1, because an etching gas may be inflowed into the center region of the hole H1 more sufficiently than the edge region of the hole H1.

The difference between the etching speeds may be compensated for by the shape of the remaining resin portion R1. That is, since the edge region of the remaining resin portion R1 is thinner than the center region of the remaining resin portion R1, the difference between the etching speeds at the edge region and the center region may be compensated, and the entire remaining resin portion R1 may be more easily removed. Therefore, the remaining resin portions R1 under the holes H1 may be removed by the etching process completely or nearly completely. The resultant of the etching process is shown in FIG. 3E.

Figure 3E:
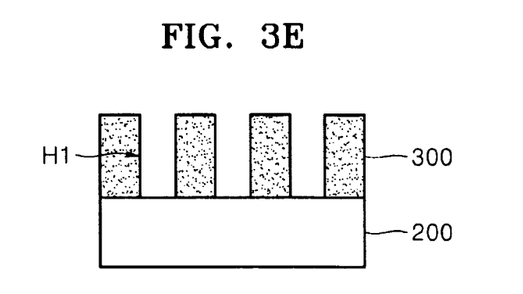

Referring to FIG. 3E, the remaining resin portions R1 (refer to FIG. 3D) are removed completely, and the substrate 200 under the holes H1 may be exposed. Each of the exposed portions of the substrate 200 may have the same width as that of the hole H1. Therefore, the resin layer 300 in which openings, that is, the holes H1, are well defined, may be obtained. A part of the substrate 200 may be patterned by using the patterned resin layer 300 as an etching mask. The substrate 200 may be a given (or alternatively, predetermined) thin film or a substrate including the thin film. The thin film may be patterned by using the patterned resin layer 300 as the etching mask.

If the remaining resin portions R1 are not completely removed by the etching process shown in FIG. 3D, the next patterning process, that is, the patterning process of the substrate 200 using the patterned resin layer 300, may not be easily (or sufficiently) performed or the patterning characteristics may be degraded. However, according to the present example embodiment, the remaining resin portions R1 may be more easily and completely removed by the etching process shown in FIG. 3D, and thus, the well patterned resin layer (300 of FIG. 3E) may be obtained. Accordingly, the patterning characteristics/results using the resin layer 300 may be improved.

Figure 4:
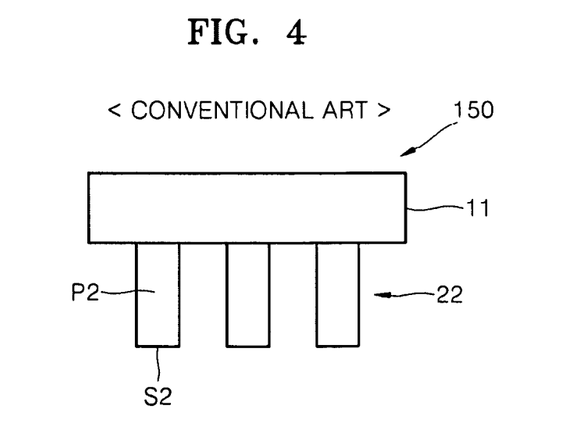
FIG. 4 is a cross-sectional view of a stamp according to a comparative example.

FIG. 4 is a cross-sectional view of a stamp 150 according to a comparative example. Referring to FIG. 4, the stamp 150 according to the comparative example may include a base portion 11 and a protrusion pattern 22 disposed on a lower surface of the base portion 11. The protrusion pattern 22 may include a plurality of protrusions P2. A bottom surface S2 of the protrusion P2 may be flat. The stamp 150 according to the comparative example may be a conventional stamp.

Figure 5A:
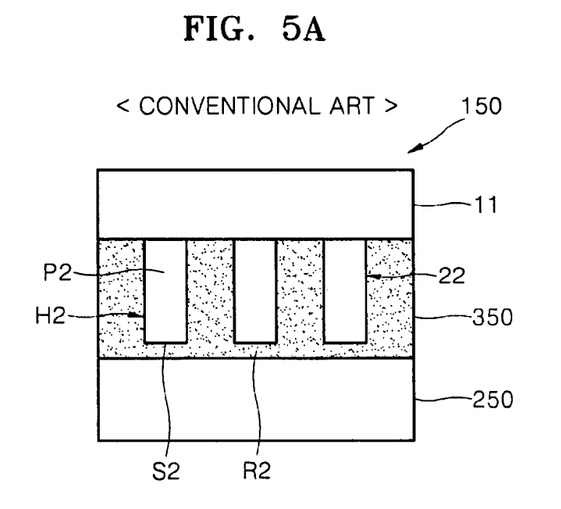
FIGS. 5A through 5C are cross-sectional views illustrating an imprinting method using the stamp shown in FIG. 4 and problems thereof.
Figure 5B:
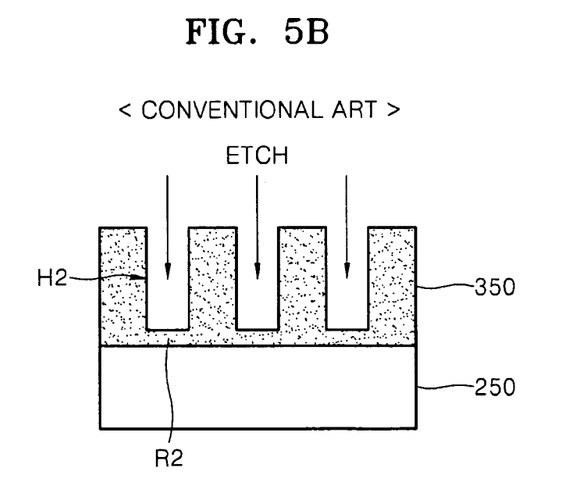
Figure 5C:
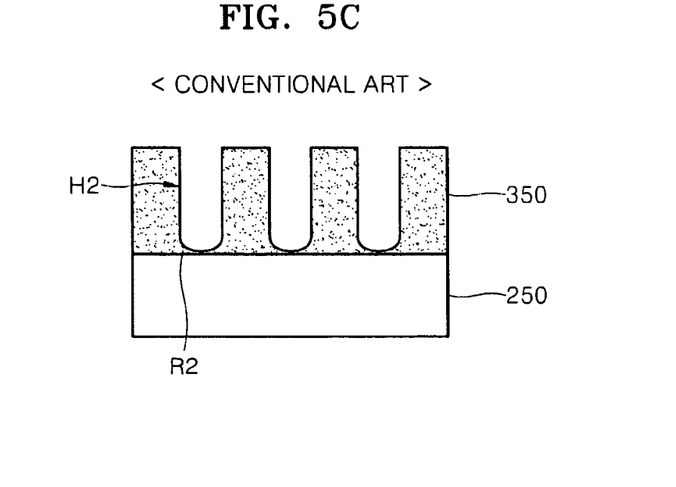

FIGS. 5A through 5C are cross-sectional views illustrating an imprinting method using the stamp 150 of FIG. 4 and problems of the imprinting method according to the comparative example.

Referring to FIG. 5A, the stamp 150 is imprinted on a resin layer 350 disposed on a substrate 250 so as to transfer shapes of the protrusion pattern 22 of the stamp 150 in the resin layer 350. Since the bottom surface S2 of the protrusion P2 is flat, a hole H2 formed by the protrusion P2 may have a flat bottom surface. That is, a remaining resin layer R2 under the holes H2 may have flat structures.

Referring to FIG. 5B, after removing the stamp 150, an etching process for removing the remaining resin layers R2 may be performed. However, the etching speed at a center region of the remaining resin layer R2 is faster than that at an edge region of the remaining resin layer R2, and thus, it may not be easy to remove the edge regions of the remaining resin layer R2. This problem may become more severe when patterns of the protrusion pattern 22 of the stamp 150 (refer to FIG. 5A) are fine, that is, widths of the protrusions P2 are reduced. That is, it becomes more difficult to remove the edges of the remaining resin layer R2 when the widths of the holes H2 are reduced in FIG. 5B. In particular, when the remaining resin layer R2 is flat, the difference between the etching speeds at the edge region and the center region is reflected to the shape of the bottom surface of the hole H2. Therefore, morphology of the bottom surface of the hole H2 may not be desirable after the etching process. The resultant of the etching process is shown in FIG. 5C.

Referring to FIG. 5C, the remaining resin layer R2 at the center region of the hole H2 is mostly removed. However, some of the remaining resin layer R2 located at the edge region of the hole H2 may remain. Therefore, a portion of the substrate 250, which corresponds to the hole H2, may not be completely exposed, and the bottom surface of the hole H2 may have a circular shape. That is, the pattern of the resin layer 350 that is formed by the imprinting process is not clearly defined.

As described above, when the stamp 150 has the protrusion P2, the bottom surface S2 of which is flat (refer to FIG. 5A), the patterns of the resin layer (350 of FIG. 5C) formed by the imprinting process are not clearly defined. In addition, when post-processes are performed by using the resin layer 350 patterned as described above, the patterning characteristics/results may be degraded. In particular, when the protrusion pattern 22 of the stamp 150 has a nano-size, the above problem becomes worse.

However, as described above, the stamp of the present example embodiment uses the protrusions having edge regions that are higher than the center regions, and thus, the thickness of the edge region of the remaining resin layer may be thinner than that of the center region. The difference between the etching speeds may be compensated for when the remaining resin layer is removed. Therefore, the resin layer patterns that are well defined may be obtained, and the post patterning process characteristics may be improved.

Hereinafter, a method of manufacturing the stamp according to an example embodiment will be described. FIGS. 6A through 6D are cross-sectional views illustrating a method of manufacturing a stamp according to an example embodiment.

Figure 6A:
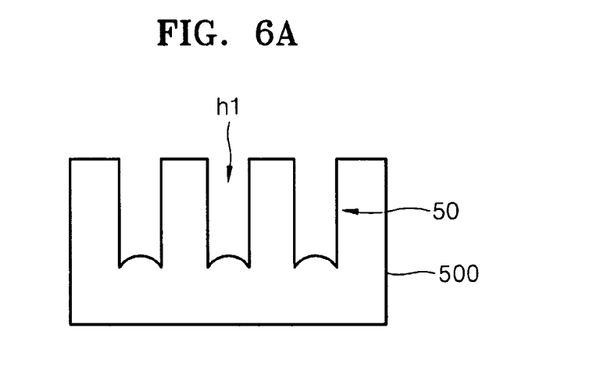
FIGS. 6A through 6D are cross-sectional views illustrating a method of manufacturing a stamp according to an example embodiment.

Referring to FIG. 6A, a master mold 500 having a protrusion pattern structure (an uneven structure) 50 on an upper surface portion thereof is provided. The master mold 500 may be formed of, for example, silicon. However, the inventive concepts are not limited thereto, and the material for forming the master mold 500 may be modified variously. The protrusion pattern structure 50 may include at least one hole h1. A bottom surface of the hole h1 may have a center region and an edge region, and the center region is higher than the edge region. For example, the bottom surface of the hole h1 may have a convex shape. However, the shape of the protrusion pattern structure 50 is an example, and may be modified variously.

Figure 6B:
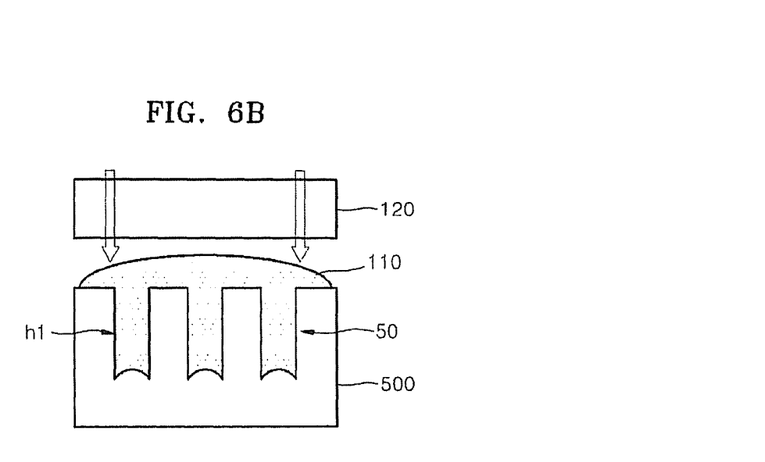

Referring to FIG. 6B, a curable material layer (hereinafter, first material layer) 110, which is able to be hardened, may be applied onto the protrusion pattern structure 50 of the master mold 500. The first material layer 110 may be a precursor of a stamp. The precursor may be a UV-curable material or a thermally curable material. The first material layer 110 may be a flexible material layer having a viscosity of about 500 cps or less. A supporting plate 120 may be located above the master mold 500. The supporting plate 120 may be formed of a firm material. If the first material layer 110 is formed of the UV-curable material, the supporting plate 120 may be formed of a material through which the UV ray may be transmitted. For example, the supporting plate 120 may be formed of quartz or glass. However, the material forming the supporting plate 200 is not limited to the quartz and glass, and various materials may be used.

The first material layer 110 may be pressed by the supporting plate 120. Pressing intensity of the supporting plate 120 with respect to the first material layer 110 may be adjusted appropriately. In order to improve an adhesive force between the supporting plate 120 and the first material layer 110, a lower surface of the supporting plate 120 may be treated by oxygen plasma or UV/ozone. Otherwise, an adhesion promoter may be coated on the lower surface of the supporting plate 120.

Figure 6C:
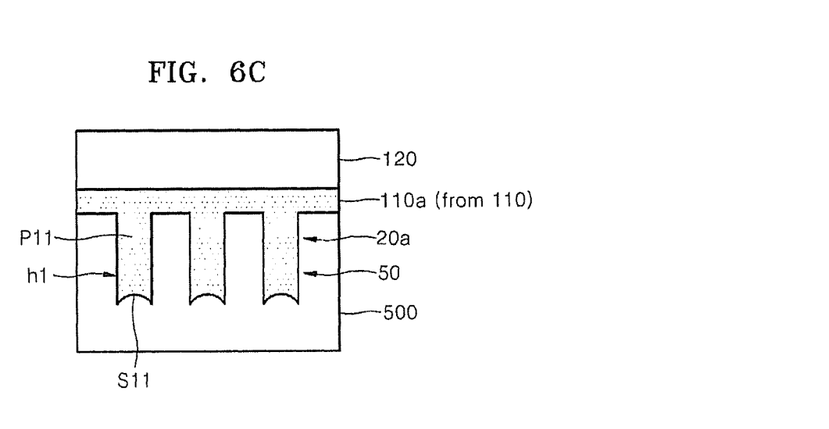

Referring to FIG. 6C, after pressing the supporting plate 120 onto the first material layer 110, the first material layer 110 may be cured so as to form a hardened layer 110a that is hardened from the first material layer 110. The hardened layer 110a may have a protrusion pattern 20a corresponding to the protrusion pattern structure 50 of the master mold 500. The hardening process of the first material layer 110 may include a process of irradiating UV rays onto the first material layer 110 or a process of annealing the first material layer 110. According to the type/kind of the first material layer 110, the hardening method of the first material layer 110 may be determined. The protrusion pattern 20a may have a plurality of protrusions P11, and a bottom surface S11 of each of the protrusions P11 may have a shape corresponding to the bottom surface of the hole h1. If the bottom surface of the hole h1 is convex, the bottom surface S11 of the protrusion P11 may be formed to be concave.

Figure 6D:
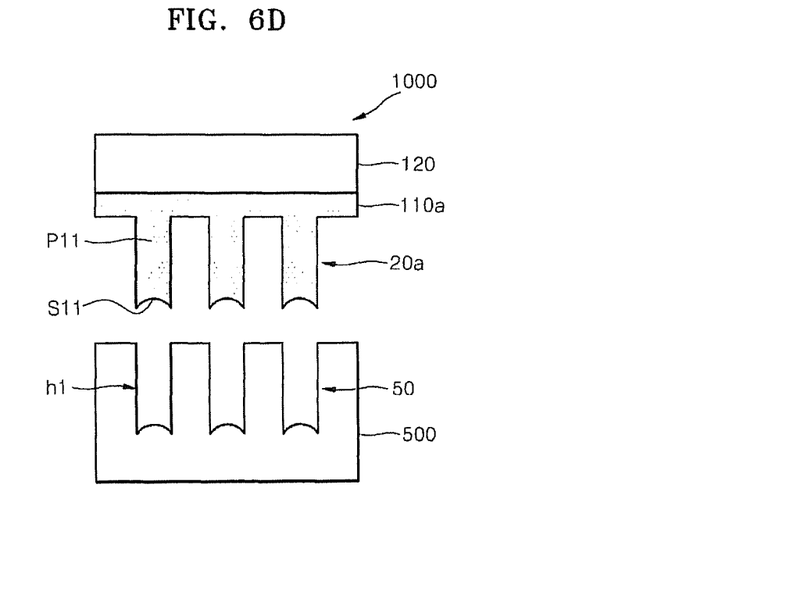

Referring to FIG. 6D, the supporting plate 120 to which the hardened layer 110a having the protrusion pattern 20a is adhered may be separated from the master mold 500. The supporting plate 120 to which the hardened layer 110a having the protrusion pattern 20a is adhered may be referred to as a stamp 1000. The stamp 1000 has a similar structure to that of the stamp 100A shown in FIG. 2.

Figure 7A:
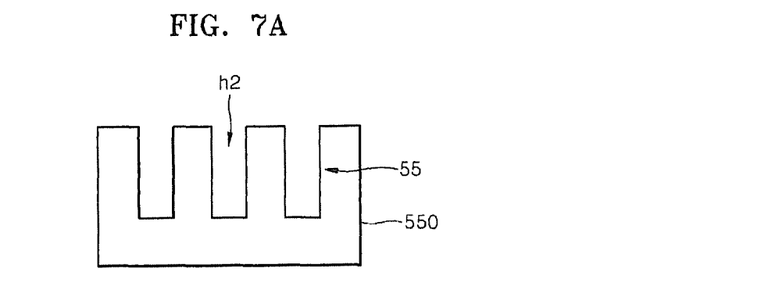
FIGS. 7A through 7E are cross-sectional views illustrating a method of manufacturing a stamp according to another example embodiment.

FIGS. 7A through 7E are cross-sectional views illustrating a method of manufacturing a stamp according to another example embodiment. Referring to FIG. 7A, a master mold 550 having a protrusion pattern structure (an uneven structure) 55 on an upper surface portion thereof is provided. The protrusion pattern structure 55 may include at least one hole h2. A bottom surface of the hole h2 may be flat.

Figure 7B:
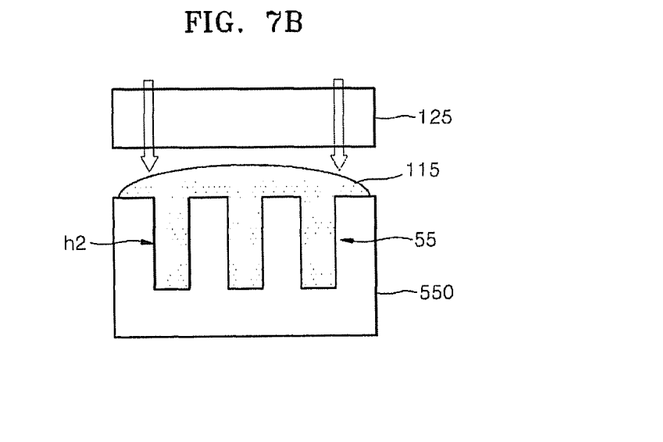

Referring to FIG. 7B, a curable material layer (hereinafter, first material layer) 115, which is able to be hardened, may be applied on the protrusion pattern structure 55 of the master mold 550. The first material layer 115 may be the same as or similar to the first material layer 110 shown in FIG. 6B. A supporting plate 125 may be located above the master mold 550. The first material layer 115 may be pressed by the supporting plate 125.

Figure 7C:
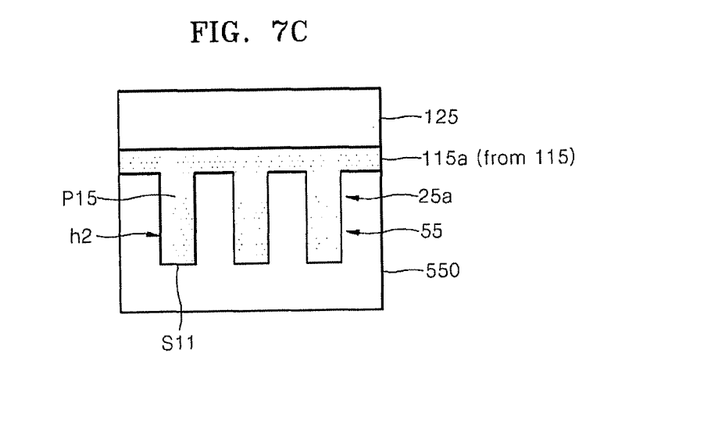

Referring to FIG. 7C, the first material layer 115 may be cured to form a hardened layer 115*a* that is hardened from the first material layer 115. The hardened layer 115*a* may include a protrusion pattern 25*a* corresponding to the protrusion pattern structure 55 of the master mold 550. The protrusion pattern 25*a* may include a plurality of protrusions P15, each having a bottom surface S15 that is flat.

Figure 7D:
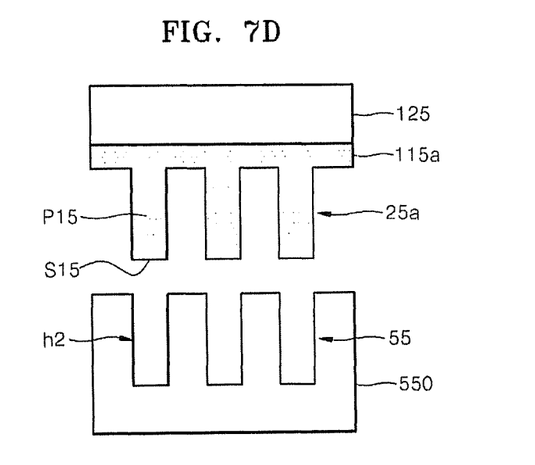

Referring to FIG. 7D, the supporting plate 125 to which the hardened layer 115*a* including the protrusion pattern 25*a* is adhered may be separated from the master mold 550.

Figure 7E:
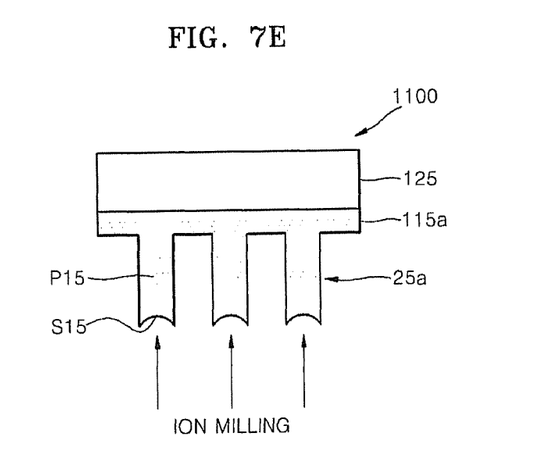

Referring to FIG. 7E, a shape of an end portion of the protrusion P15, that is, a shape of the bottom surface S15, may be modified. For example, the bottom surface S15 may be transformed from a flat structure (refer to FIG. 7D) to a structure in which an edge region is higher than a center region (for example, a concave structure). The process of transforming the bottom surface S15 of the protrusion P15 may include a process of etching the bottom surface S15. The etching may be performing in an ion milling method. A structure obtained by the process of FIG. 7E may be used as a stamp 1100.

Figure 8A:
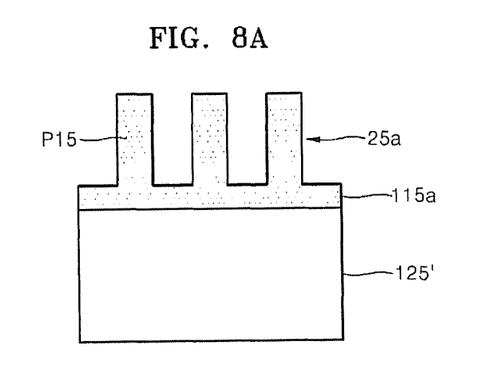
FIGS. 8A through 8D are cross-sectional views illustrating a method of manufacturing a stamp according to another example embodiment.

FIGS. 8A through 8D are cross-sectional views illustrating a method of manufacturing a stamp according to another example embodiment. Referring to FIG. 8A, a hardened layer 115*a* having the protrusion pattern (uneven portion) 25*a* is disposed on a supporting plate 125'. The protrusion pattern 25*a* may include at least one, for example, a plurality of protrusions P15. The structure shown in FIG. 8A is similar to the stamp structure shown in FIG. 7D, that is, the structure including the hardened layer 115*a* having the protrusion pattern 25*a* and the supporting plate 125, which is reversed upside down. Therefore, the structure shown in FIG. 8A may be formed in the similar way to the processes shown in FIGS. 7A through 7D.

Figure 8B:
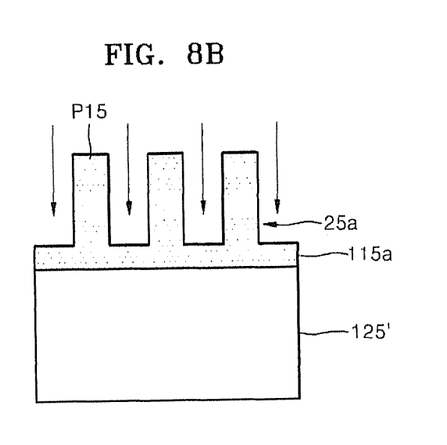

Referring to FIG. 8B, a portion of the supporting plate 125' may be etched (patterned) by using the protrusion pattern 25*a* as an etching mask. Through the etching process, shapes of the protrusion pattern 25*a* may be transferred onto the supporting plate 125'. In addition, the hardened layer 115*a* including the protrusion pattern 25*a* may be removed by the etching process or post processes. A resultant of the etching process (or the etching process and the post processes) is shown in FIG. 8C.

Figure 8C:
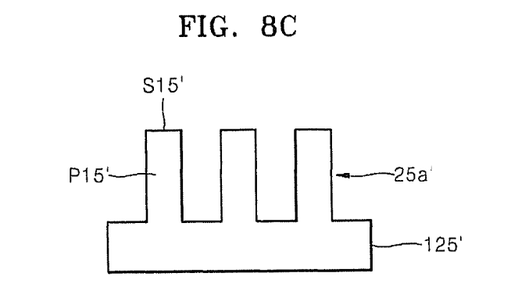

Referring to FIG. 8C, a protrusion pattern 25*a'* corresponding to the protrusion pattern 25*a* of FIG. 8B may be formed on the supporting plate 125'. The protrusion pattern 25*a'* may include a plurality of protrusions P15', and an end portion S15' of each of the protrusions P15' may have a flat structure.

Figure 8D:
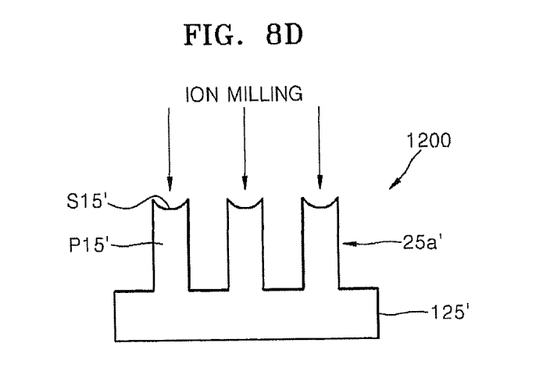

Referring to FIG. 8D, an etching process with respect to the end portions S15' of the protrusions P15' may be performed to change the shapes of the end portions S15'. The etching process may be an ion milling process. Thus, the end portions S15' of the protrusions P15' may have edge regions that are higher than the center regions, that is, concave structures, which are similar to FIG. 7E. The structure shown in FIG. 8D may be used as a stamp 1200.

It should be understood that example embodiments described therein should be considered in a descriptive sense only and not for purposes of limitation. Descriptions of features or aspects within each embodiment should typically be considered as available for other similar features or aspects in other embodiments. For example, those who skilled in the art may comprehend that the stamp structures shown in FIGS. 1 and 2, the imprinting method illustrated in FIGS. 3A through 3E, and the method of manufacturing the stamp illustrated in FIGS. 6A through 8D may be modified variously. In addition, the inventive concepts may be applied to other fields rather than the stamp for nano-imprinting process. Therefore, the scope of the inventive concepts is defined not by the detailed description but by the appended claims.

What is claimed is:

1. A stamp comprising:
a protrusion pattern on a base portion, the protrusion pattern including at least one protrusion having an end portion, the end portion having a center region and an edge region, the edge region being higher than the center region,
wherein the protrusion pattern is formed of one of a UV-cured material and a thermally-cured material, and
wherein the base portion is formed of one of quartz and glass.

2. The stamp of claim 1, wherein the end portion of the at least one protrusion has a concave shape.

3. The stamp of claim 1, wherein the at least one protrusion is nano-sized.

4. The stamp of claim 1, wherein the stamp is for performing a nano-imprinting process.

5. An imprinting method comprising:
forming a resin layer on a substrate;
imprinting a stamp onto the resin layer, the stamp including a protrusion pattern on a base portion, and the protrusion pattern includes at least one protrusion having an end portion, the end portion having a center region and an edge region, the edge region being higher than the center region, wherein the protrusion pattern is formed of one of a UV-cured material and a thermally-cured material, and wherein the base portion is formed of one of quartz and glass;
separating the stamp from the resin layer; and
etching the resin layer in a lower portion of at least one hole formed by the stamp.

6. The imprinting method of claim 5, wherein the resin layer in the lower portion of the at least one hole has a convex shape prior to the etching the resin layer.

7. The imprinting method of claim 5, wherein the etching includes planarizing a bottom surface of the at least one hole in the resin layer.

8. The imprinting method of claim 5, wherein the etching exposes portions of the substrate corresponding to the at least one hole.

9. A method of manufacturing a stamp, the method comprising:
preparing a master mold including a protrusion pattern region, the protrusion pattern region including at least one hole having an end portion, the end portion having a center region and an edge region, the center region being higher than the edge region; and forming a stamp having a protrusion pattern portion that corresponds to the protrusion pattern region by using the master mold, the stamp having the protrusion pattern portion on a base portion, the protrusion pattern portion including at least one protrusion corresponding to the at least one hole of the master mold, an end portion of the at least one protrusion having a center region and an edge region, the edge region being higher than the center region, wherein the protrusion pattern is formed of one of a UV-cured material and a thermally-cured material, and wherein the base portion is formed of one of quartz and glass.

10. The method of claim 9, wherein the preparing includes forming the end portion of the at least one hole to have a convex structure, and the forming of the stamp includes forming the end portion of the at least one protrusion to have a concave structure.

11. A method of manufacturing a stamp, the method comprising:

preparing a master mold including a protrusion pattern region;

forming a stamp having a protrusion pattern portion that corresponds to the protrusion pattern region using the master mold, the stamp having the protrusion pattern portion on a base portion; and adjusting a shape of an end portion of at least one protrusion of the protrusion pattern portion to have a center region and an edge region, the edge region being higher than the center region, wherein the protrusion pattern is formed of one of a UV-cured material and a thermally-cured material, and wherein the base portion is formed of one of quartz and glass.

12. The method of claim 11, wherein the forming forms the end portion of the at least one protrusion to have a flat surface prior to the adjusting.

13. The method of claim 11, wherein the adjusting adjusts the end portion of the at least one protrusion to have a concave structure.

14. The method of claim 11, wherein the adjusting comprises:

etching the end portion of the at least one protrusion.

15. The method of claim 11, wherein the forming the stamp comprises:

forming a material layer on the protrusion pattern region of the master mold;

hardening the material layer to form a hardened layer having a protrusion pattern portion corresponding to the protrusion pattern region; and separating the hardened layer from the master mold.

* * * * *